United States Patent
Liu et al.

(10) Patent No.: US 10,356,801 B1
(45) Date of Patent: Jul. 16, 2019

(54) SYSTEMS AND METHODS FOR IMPROVING SPECTRAL EFFICIENCIES IN A WIRELESS COMMUNICATION NETWORK

(71) Applicant: Sprint Spectrum LP, Overland Park, KS (US)

(72) Inventors: Chunmei Liu, Great Falls, VA (US); Krishna Sitaram, Chantilly, VA (US); Shipa Kowdley, Brambleton, VA (US); Hemanth Pawar, Brambleton, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 235 days.

(21) Appl. No.: 14/630,810

(22) Filed: Feb. 25, 2015

(51) Int. Cl.
*H04L 5/00* (2006.01)
*H04B 7/04* (2017.01)
*H04W 72/12* (2009.01)
*H04W 72/04* (2009.01)

(52) U.S. Cl.
CPC ......... *H04W 72/121* (2013.01); *H04L 5/0032* (2013.01); *H04L 5/0073* (2013.01); *H04W 72/046* (2013.01); *H04W 72/048* (2013.01); *H04W 72/0446* (2013.01)

(58) Field of Classification Search
CPC ........... H04W 72/121; H04W 72/0446; H04W 72/046; H04W 72/048; H04L 5/0032; H04L 5/0073
See application file for complete search history.

(56) References Cited

U.S. PATENT DOCUMENTS

| | | | | |
|---|---|---|---|---|
| 2013/0039305 A1* | 2/2013 | Kishiyama | ........ | H04W 72/1263 370/329 |
| 2013/0114434 A1* | 5/2013 | Muruganathan | ...... | H04W 16/14 370/252 |
| 2013/0229971 A1* | 9/2013 | Siomina | ................ | H04W 24/10 370/312 |
| 2014/0355702 A1* | 12/2014 | Thomas | ................ | H04L 5/0032 375/267 |

FOREIGN PATENT DOCUMENTS

WO    2013/015445 A1    1/2013

OTHER PUBLICATIONS

R1-123859, ZTE, 'On signalling support for reduced power ABS', 3GPP TSG-RAN WG1 Meeting #70, Aug. 13-17, 2012, pp. 1-4.*

* cited by examiner

*Primary Examiner* — Melvin C Marcelo

(57) ABSTRACT

Systems and methods are described for scheduling traffic in an almost blank subframe (ABS). Data transmissions to a wireless device in communication with a first access node are scheduled during an ABS scheduled by a second access node. At least one wireless device that meets a criteria is selected from a plurality of wireless devices in communication with the second access node. Data is transmitted from the second access node to the selected wireless device during the scheduled ABS using beamforming.

17 Claims, 5 Drawing Sheets

SYSTEMS AND METHODS FOR IMPROVING SPECTRAL EFFICIENCIES IN A WIRELESS COMMUNICATION NETWORK

TECHNICAL BACKGROUND

In a heterogeneous network, small access nodes (e.g., short range, low power access nodes) can be deployed at hotspots of a macro access node (e.g., strongest signal strength) to offload traffic and increase network system capacity. This allows a wireless device to be served by an access node having the lowest signal path loss rather than the strongest signal strength, as in traditional network configurations. In some instances, interference can occur at a cell edge of the small access node due to the reference signal strength of the macro access node. The macro access node may use inter-cell interference coordination techniques to consolidate wireless spectrum and frequency bands so that subframes of the wireless spectrum are "free" for allocation to the small access nodes.

Inter-cell interference coordination techniques, for example, designating subframes of the wireless spectrum as almost blank subframes (ABS), create opportunities for wireless devices operating at cell edges of small access nodes to receive downlink information from the network without interference from the macro access node. For example, scheduled transmissions from the macro access node may be minimized during the designated ABS. This reduces interference and degradation of performance of wireless devices served by the small access node, but can undesirably limit the amount of network resources allocated to wireless devices served by the macro access node during the designated subframes.

Overview

Systems and methods are described for scheduling traffic in an almost blank subframe (ABS) in a wireless communication network. In one instance, data transmissions to a wireless device in communication with a first access node may be scheduled during an ABS that is scheduled by a second access node. At least one wireless device that meets a criteria may be selected from a plurality of wireless devices in communication with the second access node. Data from the second access node transmitted may be transmitted to the selected wireless device during the scheduled ABS using beamforming.

DETAILED DESCRIPTION

In operation, deployment of small access nodes (e.g., short range, low power access node) within a geographic coverage area or signal radius of a macro access node (e.g., strongest signal strength) reduces overload of the macro access node and provides a high data rates for wireless devices operating in the geographic coverage area. In some instances, wireless devices operating at cell edges of the small access nodes may experience interference due to the reference signal strength of the signal transmitted by the macro access node. Inter-cell interference coordination techniques, for example, designating subframes as almost blank subframes (ABS), create opportunities for wireless devices operating at the cell edges of the small access nodes to receive downlink information without interference from the macro access node.

For example, in an exemplary embodiment, transmissions from the macro access node inflicting high interference on wireless devices served by the small access node (e.g., small access node users) can be periodically muted (stopped) during the designated ABS. Small access node users suffering high interference from the macro access node may be served during the designated ABS to mitigate co-channel interference and increase throughput of the communication network.

Figure 1:
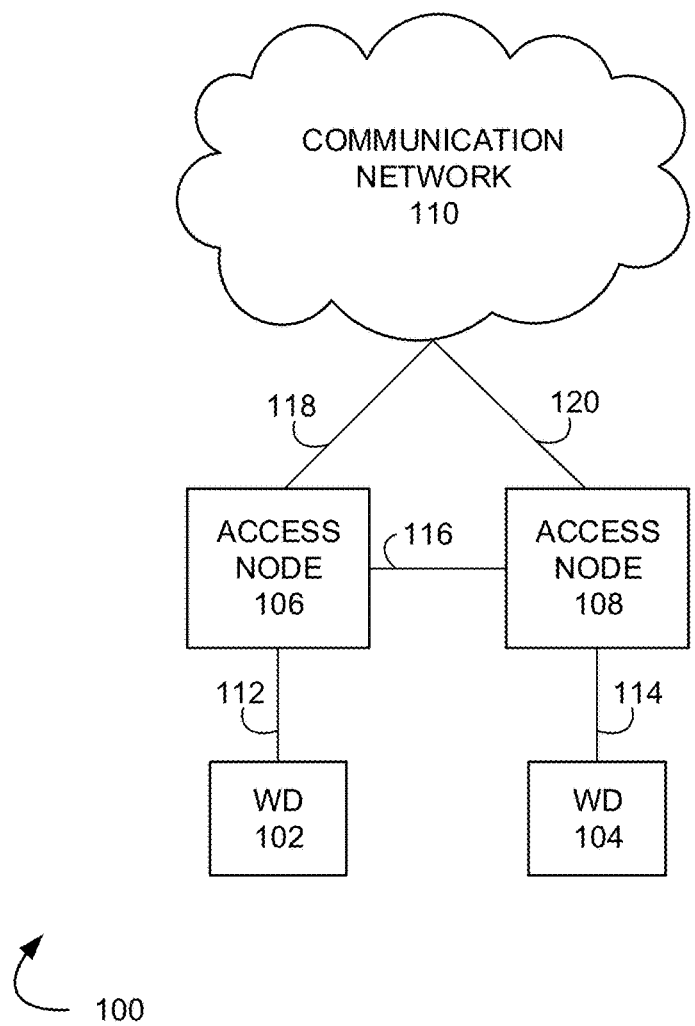
FIG. 1 illustrates an exemplary communication system for scheduling traffic in an ABS in a wireless communication network.

FIG. 1 illustrates an exemplary communication system 100 for scheduling traffic in an ABS in a wireless communication network. Communication system 100 can comprise wireless devices 102, 104, access nodes 106, 108, and communication network 110. Other network elements may be present in communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access nodes 106, 108 and communication network 110, which are omitted for clarity, including additional processing nodes, routers, gateways, and physical and/or wireless data links for carrying data among the various network elements.

Wireless devices 102, 104 can be any device configured to communicate over system 100 using a wireless communication link. For example, wireless devices 102, 104 can include a cell phone, a smart phone, a computing platform such as a laptop, palmtop, or a tablet, a personal digital assistant, or an internet access device, and combinations thereof. It is noted that while only two wireless devices are illustrated in FIG. 1 as being in communication with respective access nodes 106 and 108, any number of wireless devices can be implemented according to various exemplary embodiments disclosed herein.

Wireless devices 102, 104 can transmit and/or receive information over system 100 using various communication services. These services can include various voice, data, and/or MBMS services and applications. For example, mobile voice services, mobile data services, push-to-talk services, internet services, web browsing, email, pictures, picture messaging, video, video messaging, broadcast video, audio, voicemail, music MP3's, ring tones, stock tickers, new alerts, etc.

Access nodes 106, 108 can be any network node configured to provide communication between wireless devices 102, 104 and communication network 110. Access nodes 106, 108 can be short range access nodes or standard access nodes. A short range access node could include, for example, a microcell base station, a picocell base station, a femtocell base station, or the like. A standard access node could include, for example, a base transceiver station, a radio base station, an eNodeB device, or an enhanced eNodeB device, or the like. It is noted that while two access nodes 106, 108 are illustrated in FIG. 1, any number of access nodes can be implemented within system 100.

Communication network 110 can be a wired and/or wireless communication network and can comprise processing nodes, routers, gateways, and physical and/or wireless data links for carrying data among various network elements, including combinations thereof, and can include a local area network, a wide area network, and an internetwork (including the Internet). Communication network 110 can be capable of carrying data, for example, to support voice, push-to-talk, broadcast video, and data communications by a wireless device, for example, wireless device 102. Wireless network protocols can comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 110 comprise Ethernet, Fast Ethernet, Gigabit Ethernet, Local Talk (such as Carrier Sense multiple Access with Collision Avoidance), Token Ring, Fiber Distributed Data Interface (FDDI), and Asynchronous Transfer Mode (ATM). Communication network 110 can also comprise additional base stations, controller nodes, telephony switches, internet routers, network gateways, computer systems, communication links, or some other type of communication equipment, and combinations thereof.

Communication links 112, 114, 116, 118, 120 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links 112, 114, 116, 118, 120 can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Links 112, 114, 116, 118, 120 can be a direct link or might include various equipment, intermediate components, systems, and networks.

Figure 2A:
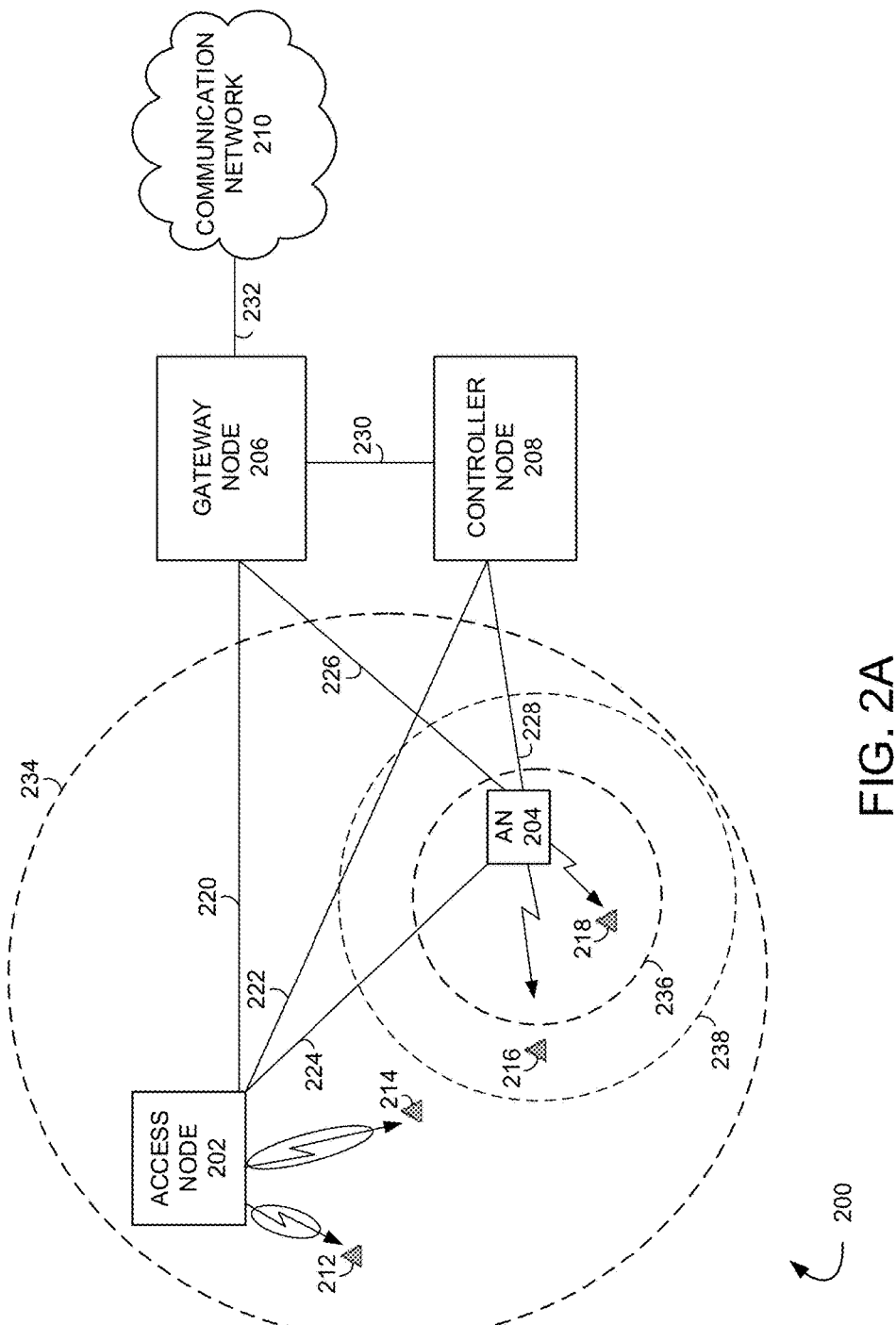
FIG. 2A illustrates another exemplary communication system for scheduling traffic in an ABS in a wireless communication network.
Figure 2B:
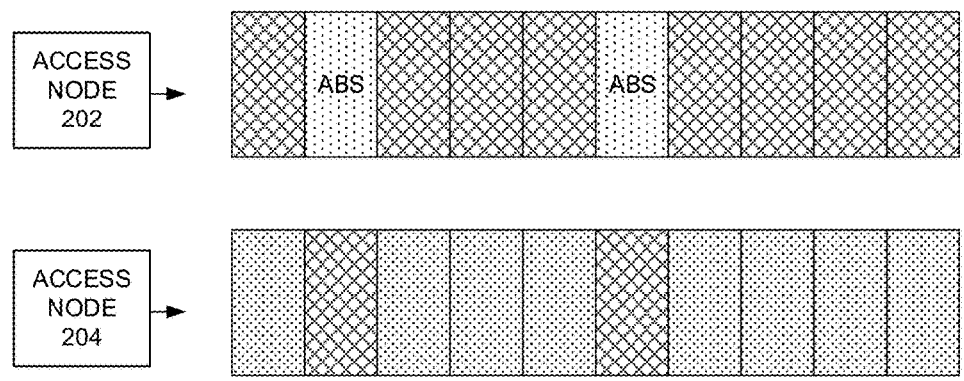
FIG. 2B illustrates exemplary almost blank subframe (ABS) patterns associated with access nodes in a geographic area.
Figure 2C:
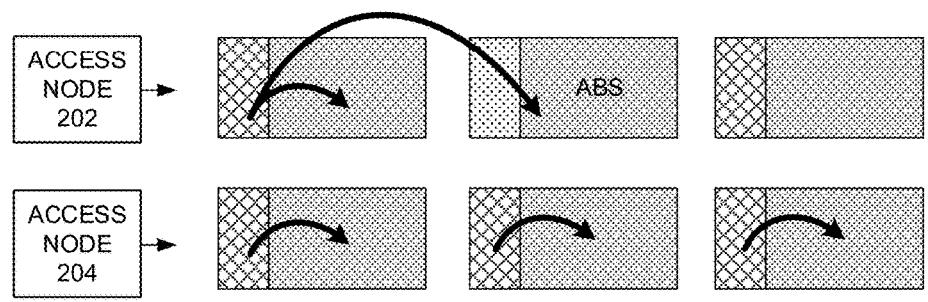
FIG. 2C illustrates an exemplary subframe pattern for scheduling traffic in an ABS associated with access nodes in a geographic area.

FIG. 2A illustrates an exemplary communication system 200 for scheduling traffic in an ABS in a wireless communication network. FIG. 2B illustrates exemplary almost blank subframe (ABS) pattern associated with access nodes in a geographic area. FIG. 2C illustrates an exemplary subframe pattern for scheduling traffic in an ABS associated with access nodes in a geographic area.

Communication system 200, illustrated in FIG. 2A, can comprise wireless devices 212, 214, 216, 218, access nodes 202, 204, gateway node 206, controller node 208, and communication network 210. Other network elements may be present in the communication system 200 to facilitate communication but are omitted for clarity, for example, base stations, base station controllers, gateways, mobile switching centers, dispatch application processors, and location registers such as a home location register or visitor location register. Furthermore, other network elements may be present to facilitate communication, such as between access nodes 202, 204 and communication network 210, which are omitted for clarity, including additional processing nodes, routers, gateways, and physical and/or wireless data links for carrying data among the various network elements.

Wireless devices 212, 214, 216, 218 can be any device configured to communicate over communication system 200 using a wireless interface. For example, wireless devices 212, 214, 216, 218 can include a remote terminal unit, a cell phone, a smart phone, a computing platform such as a laptop, palmtop, or a tablet, a personal digital assistant, or an internet access device, and combinations thereof.

The wireless interface of wireless devices 212, 214, 216, 218 can include one or more transceivers for transmitting and receiving data over communication system 200. Each transceiver can be associated with the same or different frequency bands, the same or different radio access technologies, the same or different network providers, and/or the same or different services. For example, wireless devices 212, 214, 216, 218 can include a transceiver that is associated with one or more of the following: code division multiple access (CDMA), global system for mobile communications (GSM), worldwide interoperability for microwave access (WiMAX), long-term evolution (LTE), and/or high-speed downlink packet access (HSDPA), IEEE 802.11, wireless fidelity (Wi-Fi), Bluetooth, Zigbee, infrared data association (IrDA), multimedia broadcast multicast service (MBMS), etc.

While not illustrated in FIG. 2 for clarity, wireless devices 212, 214, 216, 218 can be in communication with access nodes 202, 204 through communication links. The communication links can use various communication media, such as air, space, metal, optical fiber, or some other signal propagation path—including combinations thereof. The communication links may comprise many different signals sharing the same link. The communication links could include multiple signals operating in a single "air path" comprising beacon signals, user communications, communication sessions, overhead communications, frequencies, timeslots, transportation ports, logical transportation links, network sockets, packets, or communication directions. For example, user communication between wireless device 212 and access node 202 could share the same representative wireless link, but be transferred over different communication sessions, frequencies, timeslots, packets, ports, sockets, logical transport links, or in different directions—including combinations thereof.

Wireless devices 212, 214, 216, 218 can transmit and/or receive information over communication system 200 using various communication services. These services can include various voice, data, and/or MBMS services and applications. For example, mobile voice services, mobile data services, push-to-talk services, internet services web browsing, email, pictures, picture messaging, video, video messaging, broadcast video, audio, voicemail, music, MP3's, ring tones, stock tickers, new alerts, etc.

Access nodes 202, 204 can be any network node configured to provide communication between wireless devices 212, 214, 216, 218 and communication network 210. Access nodes 202, 204 can be standard access nodes or short range, low power access nodes. In an exemplary embodiment, access node 202 can be a standard access node having geographic coverage area or signal radius 234. Access node 204 can be a short range, low power access node having geographic coverage area or signal radius 238. The geographic coverage area 238 of access node 204 can overlap at least a portion of the geographic coverage area 234 of access node 202. The geographic coverage areas 234, 238 of access nodes 202, 204 include a cell edge portion between the full-strength geographic coverage area, for example, geographic coverage area 236 of access node 204 and the edge of the geographic coverage area 238.

A standard access node can be a macrocell access node, such as, for example, a base transceiver station, a radio base station, a NodeB device, or an enhanced NodeB device, or the like. A short range access node can be a microcell base station, a picocell base station, a femtocell base station, or the like, such as, for example, a home NodeB or a home eNodeB device. In addition, a wireless device configured to enter a hotspot mode can be a femtocell access node. It is noted that while two access nodes 202, 204 are illustrated in FIG. 2, any number of access nodes can be implemented within system 200.

Access nodes 202, 204 can comprise a processor and associated circuitry to execute or direct the execution of computer-readable instructions to obtain information. Access nodes 202, 204 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 202, 204 can receive instructions and other input at a user interface.

Gateway node 206 can be any network node configured to interface with other network nodes using various protocols that communicates, routes, and forwards communication data addressed to a wireless devices 212, 214, 216, 218. In addition, gateway node 206 can act as a mobility anchor for wireless devices 212, 214, 216, 218 during handovers between different frequencies and/or different radio access technologies supported by the same access node. Gateway node 206 can be a standalone computing device, computing system, or network component, and can be accessible, for example, by a wired or wireless connection, or through an indirect connection such as through a computer network or communication network. For example, gateway node 206 can include a serving gateway (SGW) and/or public data network gateway (PGW), etc. One of ordinary skill in the art would recognize that gateway node 206 is not limited to any specific technology architecture, such as Long Term Evolution (LTE) and can be used with any network architecture and/or protocol.

Gateway node 206 can comprise a processor and associated circuitry to execute or direct the execution of computer-readable instructions to obtain information. Gateway node 206 can retrieve and execute software from storage, which can include a disk drive, a flash drive, memory circuitry, or some other memory device, and which can be local or remotely accessible. The software comprises computer programs, firmware, or some other form of machine readable instructions, and may include an operating system, utilities, drivers, network interfaces, applications, or some other type of software, including combinations thereof. Gateway node 206 can receive instructions and other input at a user interface.

Controller node 208 can be any network node configured to communicate information and/or control information over communication system 200. Controller node 208 can be configured to transmit control information associated with a handover procedure. Controller node 208 can be a standalone computing device, computing system, or network component, and can be accessible, for example, by a wired or wireless connection, or through an indirect connection such as through a computer network or communication network. For example, controller node 208 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 208 is not limited to any specific technology architecture, such as Long Term Evolution (LTE) and can be used with any network architecture and/or protocol.

Controller node 208 can comprise a processor and associated circuitry to execute or direct the execution of computer-readable instructions to obtain information. Controller node 208 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers' network interfaces, applications, or some other type of software, including combinations thereof. Controller node 208 can receive instructions and other input at a user interface.

Access node 202 can be in communication with gateway node 206 through communication link 220 and with controller node 208 through communication link 222. Access node 202 can be in communication with access node 204 through communication link 224. Access node 204 can be in communication with gateway node 206 through communication link 226 and with controller node 208 through communication link 228. Controller node 208 can be in communication with gateway node 206 through communication link 230 and with communication network 210 through communication link 232.

Communication links 220, 222, 224, 226, 228, 230, 232 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Communication links 220, 222, 224, 226, 228, 230, 232 can be a direct link or might include various equipment, intermediate components, systems, and networks.

Communication network 210 can be a wired and/or wireless communication network, and can comprise processing nodes, routers, gateways, and physical and/or wireless data links for carrying data among various network elements, including combinations thereof, an can include a local area network, a wide area network, and an internetwork (including the Internet). Communication network 210 can be capable of carrying data, for example, to support voice, push-to-talk, broadcast video, and data communications by a wireless device, for example, wireless device 212. Wireless network protocols can comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev.

A, Third Generation Partnership Project Long Term Evolution (3GPP LTE), and Worldwide Interoperability for Microwave Access (WiMAX). Wired network protocols that may be utilized by communication network 210 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 210 can also comprise additional base stations, controller nodes, telephony switches, internet routers, network gateways, computer systems, communication links, or some other type of communication equipment, and combinations thereof.

As illustrated in FIG. 2A, small access node 204 (e.g., short range, low power access node) can be deployed within a geographic coverage area or signal radius 234 of a macro access node 202 (e.g., strongest signal strength) to reduce overload of macro access node 202 and provide a high data rate for wireless devices 212, 214, 216, 218. Wireless device 216 operating at cell edge 238 of the small access node 204 may experience interference due to the reference signal strength of the signal transmitted by macro access node 202. Inter-cell interference coordination techniques, for example, designation of subframes as almost blank subframes (ABS), create opportunities for wireless devices 216 at the cell edge 238 of small access node 204 to receive downlink information from small access node 204 without interference from macro access node 202.

As illustrated in FIGS. 2A and 2B, transmissions from macro access node 202 inflicting high interference on wireless device 216 served by small access node 204 can be periodically muted (stopped) during designated ABS. Wireless device 216 suffering high interference from macro access node 202 may be served during the designated ABS to mitigate co-channel interference and increase throughput of communication network 210. For example, in an exemplary embodiment, macro access node 202 may schedule wireless resources using existing frames and subframes of the wireless spectrum. The macro access node 202 may further designate existing frames and/or subframes as ABS to mitigate co-channel interference with wireless devices 216 served by small access nodes 204 (e.g., resource partitioning).

In another exemplary embodiment, illustrated in FIGS. 2B and 2C, macro access node 202 may transmit minimal DL control information over a Physical Downlink Control Channel (PDCCH) during the designated subframes (e.g., ABS). The DL control information can include, for example, downlink scheduling assignments that include information for receiving data on the PDCCH and uplink scheduling grants (e.g., Physical Uplink Shared Channel (PUSCH) for transmitting data to macro access node 202). For example, in an exemplary embodiment, minimal DL control information may be present on the PDCCH during the designated ABS to schedule uplink traffic for macro access node 202 and maintain Hybrid Automatic Repeat Request (HARM) ACK/NACK feedback to wireless devices 212, 214 served by macro access node 202. In another exemplary embodiment, the DL control information may enable backward compatibility, e.g., using a Carrier Routing System (CRS), for legacy wireless devices 212, 214 during the designated ABS.

Small access node 204 may be provided data about the designated set of muted ABS over, for example, an X2 interface and/or an Operation, Administration, and Maintenance (OAM) interface. Small access node 204 may use the provided data to schedule wireless devices, for example, wireless device 216, located at the cell edge 238 of small access node 204.

In some instances, neighboring macro access nodes (not shown) may generate conflicting, out-of-sequence ABS patterns. Data about the conflicting, out-of-sequence ABS patterns may be transmitted by the macro access nodes (not shown) to small access node 204 over, for example, separate X2 interfaces. Inter-cell interference may occur at cell edge 238 of small access node 204 due to the conflicting, out-of-sequence ABS patterns generated by the neighboring macro access nodes (not shown). In an exemplary embodiment, communication network 210 may designate a common frequency-domain partitioning scheme and/or ABS pattern and provide the designated scheme and/or pattern to neighboring macro access nodes (not shown) operating in a geographic coverage area. Small access node 204 may be provided data about the designated frequency-domain partitioning and/or set of muted ABS over, for example, an X2 interface and/or an OAM interface. Small access node 204 may use the provided data to schedule wireless devices, for example, wireless device 216, located at the cell edge 238 of small access node 204.

Although inter-cell interference coordination techniques, for example, designating subframes as ABS, create opportunities for wireless devices 216 located at the cell edge 238 of small access node 204 to receive DL information without interference from macro access node 202, designating frames as ABS can undesirably limit the amount of network resources allocated to wireless devices 212, 214 served by macro access node 292 during the ABS. For example, to minimize interference from macro access node 202 during designated ABS, scheduled transmissions from macro access node 202 to wireless devices 212, 214 may be minimized during the designated ABS, e.g., transmissions from macro access node 202 may be limited to transmission of DL control information over the PDCCH to wireless devices 212, 214 served by macro access node 202 during designated subframes (e.g., ABS), uplink scheduling grants for wireless devices 212, 214, etc. This reduces interference and degradation of performance of wireless devices 216, 218 served by small access node 204, but can undesirably limit the amount of network resources allocated to wireless devices 212, 214 served by macro access node 202 during the designated subframes.

In an exemplary embodiment, illustrated in FIG. 2C, macro access node 202 can schedule wireless devices 212 with a high priority (e.g., wireless devices a substantial distance from the signal radius 238 of small access node 204) that are served by macro access node 202 during the designated ABS. Macro access node 202 can transmit data to the scheduled wireless devices 212 during the designated ABS using beamforming.

Figure 3:
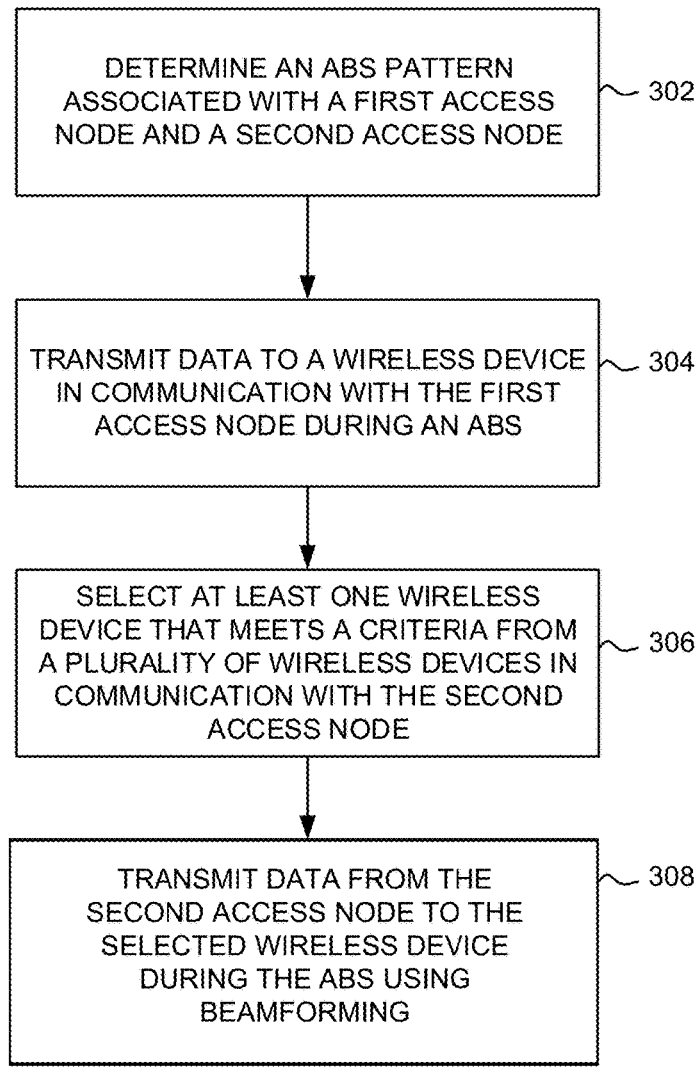
FIG. 3 illustrates an exemplary method for scheduling traffic in an ABS in a wireless communication network.

FIG. 3 illustrates a flow chart of an exemplary method for scheduling traffic in an ABS in a wireless communication network. The method of FIG. 3 will be discussed with reference to the exemplary communication system 200 illustrated in FIG. 2A, the ABS pattern illustrated in FIG. 2B, and the subframe pattern for scheduling traffic in an ABS illustrated in FIG. 2C. However, the method can be implemented in the exemplary communication system 100 illustrated in FIG. 1 or with any suitable communication system. In addition, although FIG. 3 depicts steps performed in a particular order for purposes of illustration and discussion, the methods discussed herein are not limited to any particular order or arrangement. One skilled in the art, using the disclosure provided herein, will appreciate that various steps of the methods can be omitted, rearranged, combined and/or adapted in various ways.

Referring to FIG. 3, at step 302, a network node can determine an ABS pattern associated with a first access node and a second access node. For example, in an exemplary embodiment, small access node 204 (e.g., short range, low power access node) is deployed within a geographic coverage area or signal radius 234 of macro access node 202 (e.g., strongest signal strength). Wireless device 216 operating at cell edge 238 of small access node 204 may experience interference due to the reference signal strength, PDCCH, data, etc., associated with macro access node 202. In an exemplary embodiment, inter-cell interference coordination techniques, for example, designation of subframes as almost blank subframes (ABS), are implemented to create opportunities for wireless devices 216 operating at the cell edge 238 of small access node 204 to receive downlink (DL) information from small access node 204 without interference from macro access node 202.

Inter-cell interference coordination techniques may be used to protect DL signaling of small access node 204 at cell edge 238 during the designated ABS by periodically muting (stopping) transmissions from macro access node 202 during the designated ABS to reduce co-channel interference. Data about the ABS pattern may be transmitted by macro access node 202 over, for example, an X2 interface or OAM interface. In an exemplary embodiment, for example, macro access node 202 may provide data about the set of muted ABS, e.g., the ABS pattern, to small access node 204 in a load information message, e.g., "ABSInformation" message, over, for example, the X2 interface or OAM interface. The ABSInformation message may contain ABS pattern information "ABSPatternInfo" that indicates the subframes designated by macro access node 202 as designated ABS for the purpose of interference coordination.

In another exemplary embodiment, neighboring macro access nodes (not shown) may generate conflicting, out-of-sequence ABS patterns. Data about the conflicting, out-of-sequence ABS patterns may be transmitted by the neighboring macro access nodes (not shown) to small access node 204 over, for example, X2 interfaces or OAM interfaces. Inter-cell interference may occur at cell edge 238 of small access node 204 due to the conflicting, out-of-sequence ABS patterns generated by the neighboring macro access nodes (not shown). For example, the neighboring macro access nodes (not shown) may provide data about the sets of muted ABS to small access node 204 in "ABSInformation" messages over, for example, X2 interfaces. The ABSInformation messages contain conflicting ABS pattern information "ABSPatternInfo" that indicate subframes designated by the neighboring macro access nodes (not shown) as ABS for the purpose of interference coordination. In another exemplary embodiment, communication network 210 may designate a common ABS pattern and provide the designated pattern to neighboring macro access nodes (not shown) located in a geographic coverage area. Small access node 204 may be provided data about the designated set of muted ABS over, for example, an X2 interface and/or an OAM interface. Small access node 204 may use the provided data to schedule wireless devices, for example, wireless device 216, located at the cell edge 238 of small access node 204.

In another exemplary embodiment, the designated ABS may be measured in bit maps that are approximately $n_{bits}$ wide. Each position in the bitmap may represent an ABS or non-ABS DL subframe. For example, in one exemplary embodiment, a position value "1" in the bitmap may indicate an ABS. A position value "0" in the bitmap may indicate a non-ABS.

At step 304, a network node may transmit data to a wireless device in communication with a first access node during an ABS to improve spectral efficiency. For example, control information may be transmitted over the PDCCH to wireless devices 212, 214, 216, 218 connected to access nodes 202, 204. The control information may include, for example, downlink scheduling assignments that are used to carry information necessary to receive data on a PDSCH. The control information may also include, for example, uplink scheduling grants that are used to indicate shared uplink resources (e.g., PUSCH) that are used by communication network 210 to transmit data to access nodes 202, 204 and wireless devices 212, 214, 216, 218. In an exemplary embodiment, to prevent PDCCH interference to wireless devices 216, 218 served by small access node 204, macro access node 202 may transmit scheduling assignments of PDCCH for designated ABS in a previous frame, as illustrated in FIG. 2C.

In another exemplary embodiment, small access node 204 may schedule less-interfered wireless devices, for example, wireless device 218 located at a cell center of small access node 204 in a normal subframe. Wireless devices 216 approaching outer cell edge 238 of small access node 204 may be scheduled during the designated ABS. In an exemplary embodiment, macro access node 202 may generate a subframe pattern based on a determined ABS ratio using, for example, an ABS pattern generator. The ABS pattern generator can be, for example, gateway node 206, controller node 208, or processor node 400 illustrated in FIG. 4, and may be, for example, embedded in access nodes 202, 204, adjacent to access nodes 202, 204, or an element of communication network 210. The ABS pattern generator (not shown) may be configured to generate an ABS pattern based on the determined ABS ratio of macro access node 202. For example, in time-domain, macro access node 202 may choose to limit scheduled transmissions on particular subframes, e.g., designated ABS, so that small access node 204 may transmit data to wireless devices 216, 218 with minimal degradation of performance.

In another exemplary embodiment, wireless device 216 operating at cell edge 238 of small access node 204 incurs strong data and PDCCH interference from macro access node 202. Communication network 210 may schedule wireless device 216 during the designated ABS, while wireless device 218 that incurs less interference from macro access node 202 is scheduled during a normal subframe of the subframe pattern determined by macro access node 202.

Designated ABS are considered "almost blank" since minimal control traffic on the PDCCH generated by macro access node 202 is still present during the ABS so that macro access node 202 can schedule uplink traffic and maintain HARQ ACK/NACK feedback to wireless devices 212, 214 connected to macro access node 202. Signals that enable backward compatibility, e.g., CRS signals, may be transmitted to wireless devices 212, 214 during the designated ABS.

At step 306, at least one wireless device that meets a criteria may be selected from a plurality of wireless devices in communication with a second access node located in a geographic coverage area. For example, macro access node 202 can schedule wireless devices 212 having a high priority (e.g., wireless devices a substantial distance from the signal radius 238 of small access node 204) that are served by macro access node 202 during the designated ABS. In an exemplary embodiment, wireless device 212 may be selected to be scheduled during the designated ABS with a higher priority than, for example, wireless device 214. Wireless device 212 is scheduled with a higher priority than wireless device 214 because wireless device 212 is located a further distance from wireless device 216 operating at cell edge 238 of small access node 204 than wireless device 214.

At step 308, the second access node may transmit data to the selected wireless device during the designated ABS using beamforming. In an exemplary embodiment, macro access node 202 may schedule selected wireless device 212 during the designated ABS and may transmit data to the selected wireless device 212 using beamforming. The subframe pattern generated at, for example, macro access node 202, may be provided to small access node 204. In one exemplary embodiment, time-domain partitioning protects the DL signaling of small access node 204 at cell edge 238 by periodically muting (stopping) wide-spread transmissions from macro access 202 to wireless devices 212, 214 served by macro access node 202 in the designated ABS to reduce co-channel interference with wireless devices 216 operating at cell edge 238. Small access node 204 is provided data about the ABS pattern over, for example, an X2 or OAM interface and may use the transmitted data to schedule wireless devices 216 located at the cell edge 238 of small access node 204 without interference from macro access node 202.

In another exemplary embodiment, macro access node 202 uses beamforming or spatial filtering to direct data to a selected wireless device 212 served by macro access node 202 during the designated ABS. Beamforming and spatial filtering are signal processing techniques that use, for example, sensor arrays to direct signal transmissions and receptions. For example, beamforming uses multiple antennas to control the direction of a wavelength by weighting a magnitude and phase of an individual antenna signal in the array, e.g., transmit beamforming, to provide increased coverage to designated areas along edges of geographic coverage areas 234, 238. Each antenna in the array contributes to a steered signal to achieve an array gain, which forms beams of concentrated energy. In an exemplary embodiment, macro access node 202 uses the array gains (not shown) to direct signal transmissions and receptions of data at a particular angle to the selected wireless device 212 during the designated ABS without interfering with wireless devices 216 located at the cell edge 238 of small access node 204, e.g., spatial selectivity.

One skilled in the art, using the disclosure provided herein, will appreciate that various steps of the methods can be omitted, rearranged, combined and/or adapted in various ways and can be completed by multiple wireless devices and access nodes, for example between wireless devices 212, 214, 216, 218 and access nodes 202, 204.

Figure 4:
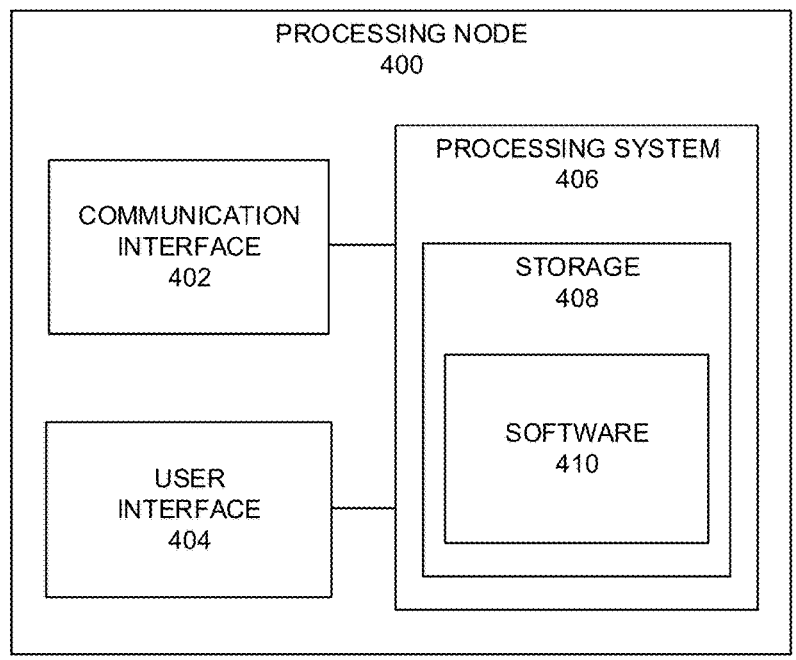
FIG. 4 illustrates an exemplary processing node.

FIG. 4 illustrates an exemplary processing node 400 in a communication system. Processing node 400 comprises communication interface 402, user interface 404, and processing system 406 in communication with communication interface 402 and user interface 404. Processing node 400 can be configured to determine a communication access node for a wireless device. Processing system 406 includes storage 408, which can comprise a disk drive, flash drive, memory circuitry, or other memory device. Storage 408 can store software 410 which is used in the operation of the processing node 400. Storage 408 may include a disk drive, flash drive, data storage circuitry, or some other memory apparatus. Software 410 may include computer programs, firmware, or some other form of machine-readable instructions, including an operating system, utilities, drivers, network interfaces, applications, or some other type of software. Processing system 406 may include a microprocessor and other circuitry to retrieve and execute software 410 from storage 408. Processing node 400 may further include other components such as a power management unit, a control interface unit, etc., which are omitted for clarity. Communication interface 402 permits processing node 400 to communicate with other network elements. User interface 404 permits the configuration and control of the operation of processing node 400.

Examples of processing node 400 include access nodes 106, 108, 202, 204, gateway node 206, and controller node 208. Processing node 400 can also be an adjunct or component of a network element, such as an element of access nodes 106, 108, 202, 204, gateway node 206, and controller node 208. Processing node 400 can also be another network element in a communication system. Further, the functionality of processing node 400 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for scheduling traffic in an almost blank subframe (ABS) in a wireless communication network, the method comprising:

scheduling data transmissions to a wireless device in communication with a first access node during an ABS scheduled by a second access node;

selecting at least one wireless device that meets a criteria from a plurality of wireless devices in communication with the second access node;

transmitting, from the second access node, downlink control information for the scheduled ABS to one or more of the plurality of wireless devices during a previous subframe, wherein downlink control information is not transmitted to the one or more of the plurality of wireless devices during the scheduled ABS; and transmitting data from the second access node to the selected wireless device during the scheduled ABS using beamforming, wherein the transmission of data to the selected wireless device using beamforming is not muted during the scheduled ABS.

2. The method of claim 1, wherein transmitted data from the second access node to the plurality of wireless devices are periodically muted during the ABS of a subframe pattern.

3. The method of claim 1, wherein uplink scheduling grants are scheduled by the second access node for one or more of the plurality of wireless devices during the previous subframe.

4. The method of claim 3, wherein backward compatibility for wireless communication with the plurality of wireless devices is enabled during the ABS.

5. The method of claim 1, wherein the second access node transmits scheduling assignments for the ABS in the previous subframe.

6. The method of claim 5, wherein the first access node schedules a less interfered wireless device in a non-ABS.

7. The method of claim 1, wherein the criteria is distance of the selected wireless device from a cell edge of the first access node.

8. A system for scheduling traffic in an almost blank subframe (ABS) in a wireless communication network, the system comprising:

a controller configured to:

schedule data transmissions to a wireless device in communication with a first access node during an ABS scheduled by a second access node;

select at least one wireless device that meets a criteria from a plurality of wireless devices in communication with the second access node;

transmit downlink control information for the scheduled ABS to one or more of the plurality of wireless devices during a previous subframe, wherein downlink control information is not transmitted to the one or more of the plurality of wireless devices during the scheduled ABS; and transmit data from the second access node to the selected wireless device during the scheduled ABS using beamforming, wherein the transmission of data to the selected wireless device using beamforming is not muted during the scheduled ABS.

9. The system of claim 8, wherein scheduled data transmissions from the second access node to the plurality of wireless devices are periodically muted during the ABS of a subframe pattern.

10. The system of claim 8, wherein uplink scheduling grants are scheduled by the second access node for one or more of the plurality of wireless devices during the previous subframe.

11. The system of claim 10, wherein backward compatibility for wireless communication with the plurality of wireless devices is enabled during the ABS.

12. The system of claim 8, wherein the second access node transmits scheduling assignments for the ABS in the previous subframe.

13. The system of claim 12, wherein the first access node schedules a less interfered wireless device in a non-ABS.

14. The system of claim 8, wherein the criteria is distance of the selected wireless device from a cell edge of the first access node.

15. A method for scheduling traffic data frames in a wireless communication network, the method comprising:

scheduling data frames for a plurality of wireless devices in communication with a first access node, wherein the data frames comprise a plurality of subframes that include muted subframes where data transmissions from the first access node to the plurality of wireless devices are stopped;

scheduling at least one wireless device in communication with a second access node during the muted subframes;

selecting at least one wireless device from the plurality of wireless devices in communication with the first access node that meets a criteria;

transmitting, from the first access node, downlink control information for the muted subframes to one or more of the plurality of wireless devices during a previous subframe, wherein downlink control information is not transmitted to the one or more of the plurality of wireless devices during the muted subframes; and transmitting data from the first access node to the selected wireless device during the muted subframes using beamforming.

16. The method of claim 15, wherein uplink scheduling grants are scheduled by the first access node for one or more of the plurality of wireless devices during the previous subframe.

17. The method of claim 15, wherein the second access node is within a coverage area of the first access node.

* * * * *